Nov. 22, 1960

C. BLACK 2,961,383

EXTRACTIVE DISTILLATION

Filed May 5, 1958

INVENTOR:
CLINE BLACK
BY: J. Reid Anderson
HIS ATTORNEY

Nov. 22, 1960 C. BLACK 2,961,383
EXTRACTIVE DISTILLATION
Filed May 5, 1958 4 Sheets-Sheet 2

INVENTOR:
CLINE BLACK
BY: J. Reid Anderson
HIS ATTORNEY

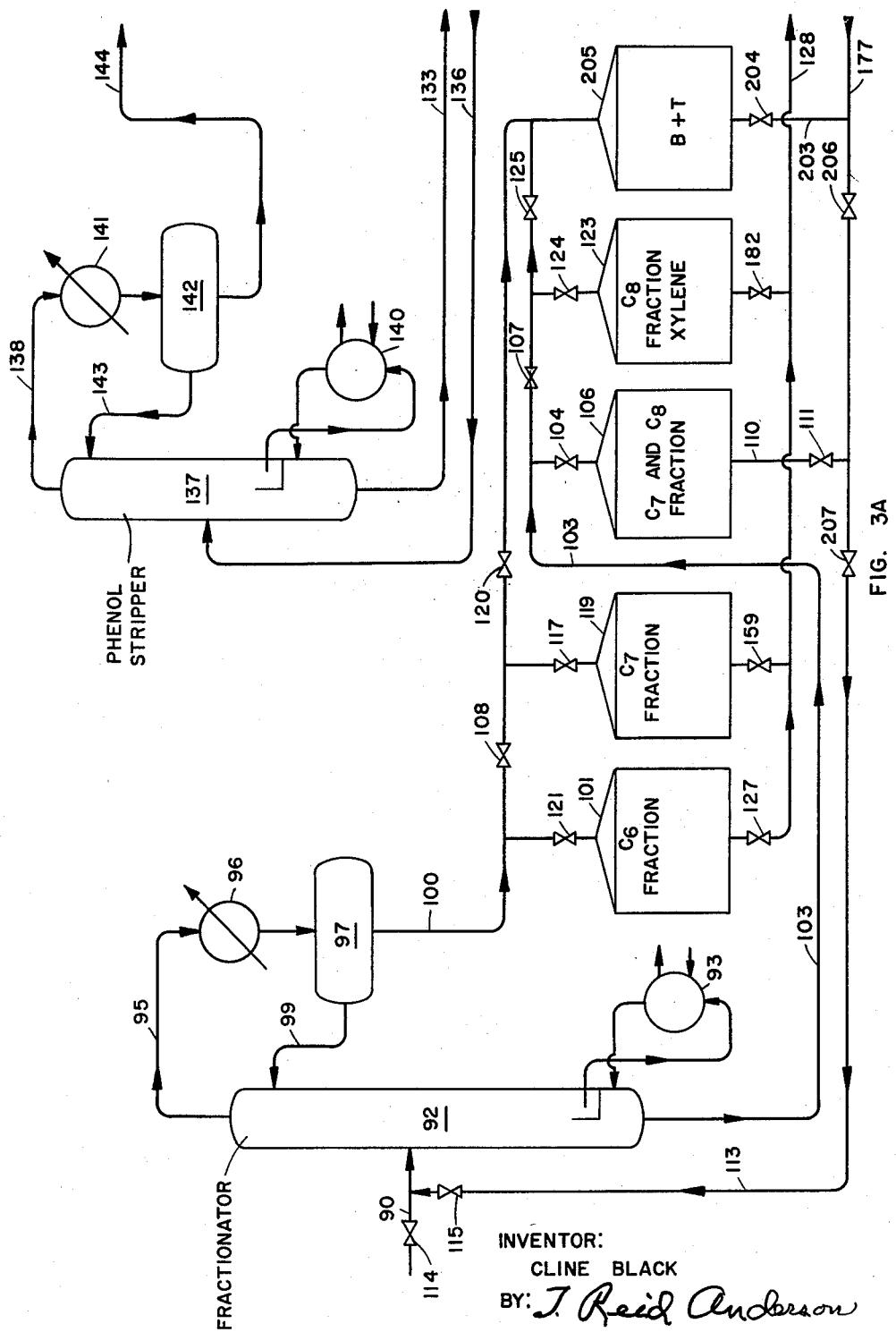

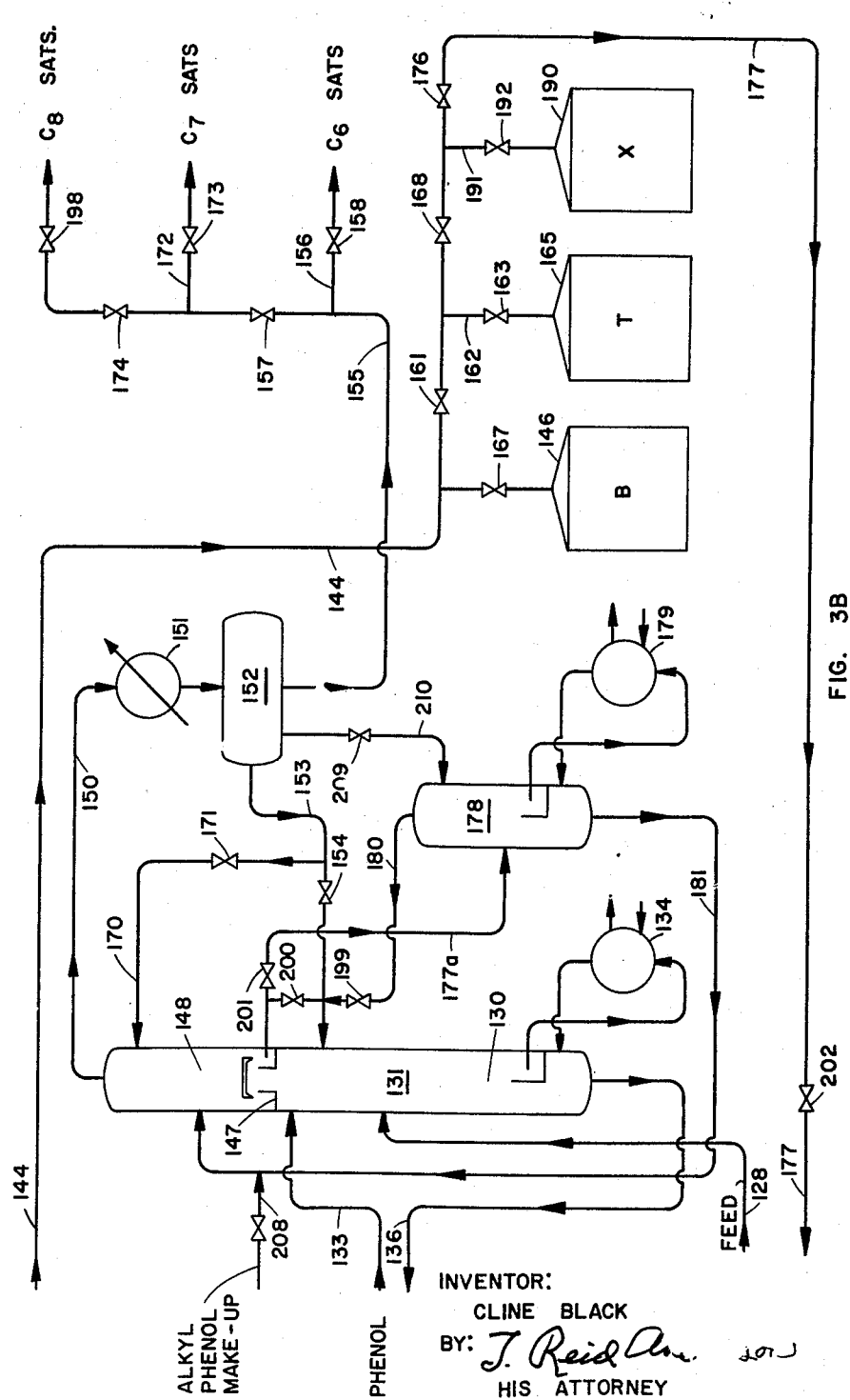

United States Patent Office 2,961,383
Patented Nov. 22, 1960

2,961,383

EXTRACTIVE DISTILLATION

Cline Black, Berkeley, Calif., assignor to Shell Oil Company, New York, N.Y., a corporation of Delaware Filed May 5, 1958, Ser. No. 733,074

2 Claims. (Cl. 202—39.5)

This invention relates to extractive distillation for toluene and xylenes recovery from hydrocarbon mixtures, utilizing phenol as the solvent. The process of the invention is particularly suitable for the separation of these materials from close boiling mixtures which contain a material or materials that normally azeotrope with the phenol, thereby resulting in some phenol loss in the raffinate passing overhead from the extractive distillation zone. The improved process of the invention may be operated to reduce significantly or substantially forestall the loss of phenol in the raffinate.

Toluene and the xylenes, chemicals formerly obtained principally from the coal tar industry, have been in recent years recovered in increasingly larger amounts from the petroleum derived streams such as reformed napthas. These petroleum streams contain hydrocarbon compounds whose normal volatilities are approximately the same as the aromatic materials being recovered and for this reason the separation of the toluene and the xylenes cannot be satisfactorily achieved through conventional fractional distillation. Hence, it has been necessary to resort to the more costly process of extractive distillation in an attempt to obtain efficient separation of the aromatics from the close boiling components of the hydrocarbon mixtures. Conventionally, toluene is recovered from a $C_7$ mixture and the xylenes are removed from a relatively narrow $C_8$ fraction.

The principal extraction distillation solvent used for the separation of toluene is phenol. Unfortunately it has not been possible generally to operate the extractive distillations without some phenol loss occurring overhead in the raffinate stream. In order to remedy the situation, the raffinate has been passed through a knock-back or rectification section for the purpose of removing the phenol from the raffinate. The knock-back section is normally placed above the extractive distillation zone within the same column. However, even this approach has not proven fully successful since nearly all of the toluene enriched feed streams carry a material or materials which azeotrope with the phenol. For example, $C_7$ feed stocks suitable for toluene extraction inevitably carry some $C_8$ saturated hydrocarbons and if the higher boiling components of these materials are present in any significant amount, the phenol cannot be completely separated from the raffinate stream through simple rectification in the knock-back section. It has been suggested that a better prefractionation to furnish a more narrow cut of the reformed naphtha to the extraction distillation zone, eliminating the higher boiling $C_8$ saturated hydrocarbons, would correct the situation. However, this is not the complete answer since nearly all of the $C_8$ paraffins with the exception of 2,2,4-trimethyl pentane and n-octane azeotrope with the toluene and hence, prefractionation to remove the $C_8$ without significant loss of toluene is clearly impractical if not impossible. Additionally, it has been generally experienced that the phenol loss is aggravated if the extractive distillation column is operated to obtain a high recovery of toluene. For the foregoing reasons, it has been necessary to compromise between minimum phenol loss and maximum toluene recovery in the operation of toluene extractive distillation systems.

Cresylic acid mixtures have been conventionally used for extractive distillation of the xylenes from their $C_8$ fractions. Again as in the instance of the toluene the material has been chiefly recovered from reformed naphthas, but here prefractionated to obtain a $C_8$ fraction. Phenol provides a higher alpha value for the separation of the $C_8$ saturates from the xylenes in the $C_8$ fraction and for this reason would be a more desirable solvent than the cresylic acid mixture. However, phenol cannot be used because of the prohibitively large phenol loss in the raffinate which loss cannot be reduced to a tolerable proportion, even with the employment of a rectification zone beyond the extraction distillation zone. Since phenol has proven generally unsatisfactory for xylene recovery, it has been the practice in plants recovering both toluene and xylenes to employ separate solvents for these two extractive distillations, usually phenol for the toluene separation and a cresylic acid mixture for the xylene recovery. This need for two different solvents has complicated the use of a single extractive distillation unit for the alternate recovery of xylenes and toluene and also has necessitated the maintenance of two solvent inventories. If the same column is used for both separations a change of solvents is a practical difficulty encountered each time the separation is changed.

It is an object of the present invention to provide an improved extractive distillation method for the recovery of toluene with a significant reduction or a substantial elimination of the phenol loss.

Another object is to provide an improved extractive distillation process permitting the use of phenol as the solvent in the separation of xylenes from a close boiling mixture containing them.

Another object is to provide an improved extractive distillation process utilizing phenol as the solvent which permits an economically feasible, high recovery of the toluene.

A still further object is to provide a process permitting the use of a most effective single extractive distillation solvent, namely, phenol, for the separation of toluene and the xylenes from their respective fractions. Other objects and advantages of this invention will become apparent from the following description taken in conjunction with the accompanying drawings wherein are set forth by way of illustration and example certain embodiments of this invention.

Figs. 3A and 3B are a diagrammatic representation of a system including a fractionator and a single extraction distillation tower, employing a single solvent (phenol) in the extractive distillation zone proper, for the recovery of benzene, toluene and the xylenes in turn from their respective fractions.

Figure 1:
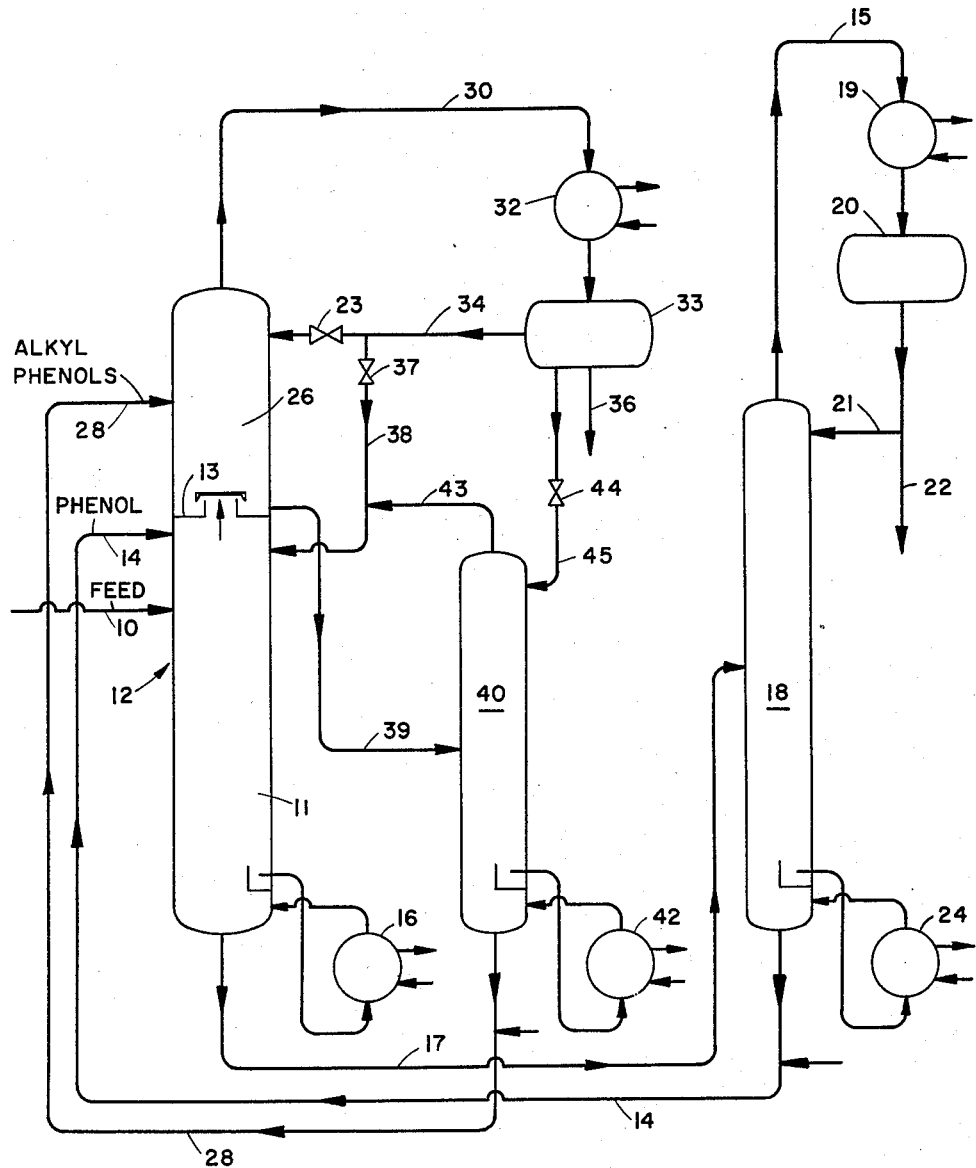
Fig. 1 is a schematic diagram of a preferred system for performing the process.

It has now been discovered that in an extractive distillation process using phenol as the solvent for the recovery of either toluene or the xylenes from hydrocarbon feed mixtures containing a compound or compounds which normally azeotrope with the phenol solvent that the loss of phenol escaping overhead in the raffinate from the process can be significantly reduced or substantially prevented by directing the raffinate through a solvent knock-back or rectification zone in which an alkyl phenol is maintained in the liquid on at least some of the plates in amounts adequate to reduce significantly the volatility of the phenol relative to its normal azeotrope former. The presence of the alkyl phenol results in a more complete rectification of the phenol from the raffinate and permits the withdrawal of the hydrocarbon raffinate from the top of the rectifying section with a significantly reduced phenol content relative to that experienced in the absence of the alkyl phenol. The alkyl phenol used as the volatility modifier should have a boiling point in excess of about 392° F. and contain at least 8 carbon atoms.

In a preferred embodiment of the process, the high boiling alkyl phenol is introduced to a tray at an upper level of the rectification zone. The high boiling material passes downwardly through the zone with the result that the lower trays have maintained on them a liquid that is capable of reducing significantly the volatility of the phenol relative to the azeotrope former or formers of the raffinate. Liquid may be removed from a tray at a lower level of the rectification zone and passed to a fractionating column where the high boiling alkyl phenol is separated from the rest of the liquid and recycled to the tray at the upper level of the rectification zone. The rest of the withdrawn liquid is returned to the process, at a point below the point of withdrawal in the instance where a single column houses the rectification and the extractive distillation zones. In an alternative system, the high boiling alkyl phenol is withdrawn with the solvent extract phase from the bottom of the extractive distillation zone proper, after having passed therethrough, and the high boiling alkyl phenol is subsequently separated from the solvent and returned to the rectification zone.

Various alkyl phenols or mixtures of them boiling above 392° F. and having at least 8 carbon atoms may be used. Among the suitable solvents are the several xylenols including 2,4-dimethyl phenol, 2,5-dimethyl phenol, 2,6-dimethyl phenol and particularly 2,3-dimethyl phenol. The ethyl phenols are also suitable. Suitable trimethyl phenols include 2,4,6-trimethyl phenol (mesitol) and especially 2,4,5-trimethyl phenol which has a boiling point of 455° F. Cumenol (para isopropyl phenol) is also satisfactory. The $C_4$ phenols such as para butyl phenol or para secondary butyl phenol are suitable solvents in the process. The preferred material is a commercially available alkyl phenol mixture made up chiefly of $C_4$ and higher alkyl phenols with some $C_3$ alkyl phenols and having a boiling range of 464°–572° F. with approximately 50% of the mixture boiling below 500° F. The usual impurities present in the commercial solvent do not interfere with the usefulness of the material. Another suitable alkyl phenol mixture, likewise commercially available, has a boiling range of approximately 428° F.–464° F. This latter material has approximately 20% $C_2$ alkyl phenols, 60% $C_3$ alkyl phenols, and roughly 19% $C_4$ alkyl phenols with the balance being made up of sulfur and nitrogen compounds.

The high boiling alkyl phenol introduced into the rectification zone may be employed in varying amounts to reduce the volatility of the phenol relative to that of the raffinate. Generally speaking, it is recommended that the solvent be used in an amount within the range of about 0.03 to 0.35 volume per volume of the raffinate hydrocarbon. Amounts in excess of 0.35 volume of solvent per volume of the raffinate may be employed but such practice is generally uneconomical. In the instance of a $C_8$ separation to recover xylenes, the amount of solvent will usually be in the range of about 0.05 to 0.35 volume per volume of the raffinate, and preferably about 0.17 volume of the solvent per volume of the raffinate hydrocarbon. Somewhat smaller quantities of the solvent are usually required for the separation of toluene from a $C_7$ fraction and normally 0.03 to 0.20 volume of solvent per volume of the raffinate is satisfactory with a preferred rate of about 0.10 volume being used.

Packed towers employing Raschig rings and other types of packing may be substituted for the tray type column. However, packed columns are not widely used in the petroleum industry principally because of the tendency for the liquid to channel and drain down along the walls rather than through the packing. The term tray or plate column or zone is used generically to include the packed variety.

Preferably the feed stock to either a toluene or xylene separation is a prefractionated reformed naphtha stream, in the instance of the toluene separation a $C_7$ fraction is used and for the xylene separation, a $C_8$ fraction is employed. A suitable feed stock to the toluene separation may have a boiling range of say 200° F. to 260° F. or perhaps somewhat lower and the fraction to the xylene separation may have a boiling range extending from 260° F. to approximately 315° F. In the event benzene is being recovered from the reformed naphtha its $C_6$ fraction may extend from about 145° F. to 200° F.

Referring to Fig. 1 a prefractionated reformed naphtha containing principally $C_7$ paraffins and toluene is passed via a line 10 to a lower section 11 of an extractive distillation column 12. The $C_7$ paraffins are mainly 2-methyl hexane, 3-methyl hexane and normal heptane. The feed stream may be introduced either as a vapor or a liquid preferably at just below its boiling point. Phenol in a solvent:feed ratio of 3:1 enters the column adjacent the top of the extractive distillation zone through a line 14. The solvent:feed ratio may vary somewhat from the preceding but will generally be in the range of 1.5–5 parts of solvent to one part of feed on a volume basis. The heat needed for the operation of the column is supplied by a reboiler 16 and the tower is maintained at substantially conventional pressure and temperatures. The descending solvent extracts the toluene from the feed stock and is removed in the solvent extract phase from the base of the tower via a line 17 and is passed to a conventional solvent stripper 18. The conditions of the stripper are conventional and the product toluene is withdrawn overhead from the stripper in a line 15 to a condenser 19 with the condensate toluene being collected in a receiver 20. A portion of the condensate is returned as reflux to the top of the stripper in a line 21 and the rest of the liquid toluene is withdrawn as product via a line 22. The heat necessary for the operation of the stripper is supplied by a reboiler 24. The stripped phenol solvent, free of toluene, is cooled and returned to the extractive distillation tower through the previous mentioned line 14. The raffinate from the extractive distillation zone 11 of the column passes upwardly through a liquid trap-out tray 13 to the overlying rectification section or knock-back zone 26 which makes up the upper portion of the column. This zone is provided with several plates, for example, 10 or so, the actual number depending upon the usual design factors such as the amount of reflux, volume of raffinate, relative volatility of the raffinate and phenol, etc. The raffinate from the underlying extractive distillation zone of the column contains some phenol and due to the presence of the azeotrope formers the several plates of the rectification section would be unable in themselves to separate completely the phenol from the raffinate. In order to achieve this separation, the high boiling mixture of alkyl phenols, previously described, having a boiling range of 464° F.–572° F. is introduced to an upper level of the rectification zone through a line 28, preferably at a level which is a few trays removed from the top of the zone, thus providing trays for the rectification of the alkyl phenol out of the raffinate, forestalling its loss in the overhead raffinate stream. By introducing the high boiling alkyl phenol mixture to this upper level of the zone, the liquid mixture will appear on each of the trays below the point of introduction, thus assuring a reduced volatility of the phenol relative to its normal azeotrope formers on each of the trays. Depending upon the conditions of the operation and the design of the extractive distillation zone, it now becomes possible either to reduce significantly the phenol content of the raffinate or to forestall substantially the loss of any phenol in the raffinate.

Phenol losses in the range of 0.2–0.7 based on the weight of the raffinate are commonly experienced in the absence of the use of the high boiling alkyl phenol in a conventional extractive distillation of toluene.

The raffinate now substantially free of phenol leaves the top of the rectification zone in a line 30, passing to a condenser 32 where the vapors condensed, with the condensate being collected in a receiver 33. Portions of the condensate are returned to the top tray of the rectification zone of column 12 as reflux by a line 34 and to the top of a column 40 as reflux by a line 45 and the rest of the raffinate is removed from the process through a line 36. In some instances it may be desirable to pass a portion of the reflux to the top of the extractive distillation zone itself and if so this may be achieved by opening valve 37 in a line 38 which opens into the top of that lower zone. If the operation should demand most of the reflux be passed to the extractive distillation zone the proportion of reflux to the rectification zone may be adjusted by a suitable setting of the valve 23.

In the embodiment of the process illustrated in Fig. 1 in order to avoid possible overloading of the extractive distillation zone of the column and to obtain certain heat economies, the liquid collecting on the trap out tray 13 in the lower section of the rectification zone is removed via a line 39 to a fractionating column 40 to accomplish separation of the alkyl phenol mixture from the rest of the liquid. A reboiler 42 supplies the heat required for distilling overhead the non-alkyl phenol solvent portion of the withdrawn stream, which overhead stream returns in a line 43 to the extractive distillation zone of the column at a point below the withdrawal tray and below the tray on which the phenol is admitted. Valve 44 controls the reflux supplied to column 40 for rectifying back the alkyl phenols. The high boiling alkyl phenols are cooled and recycled to the top of the rectification zone of column 12 through line 28 from the bottom of the column 40.

Figure 2:
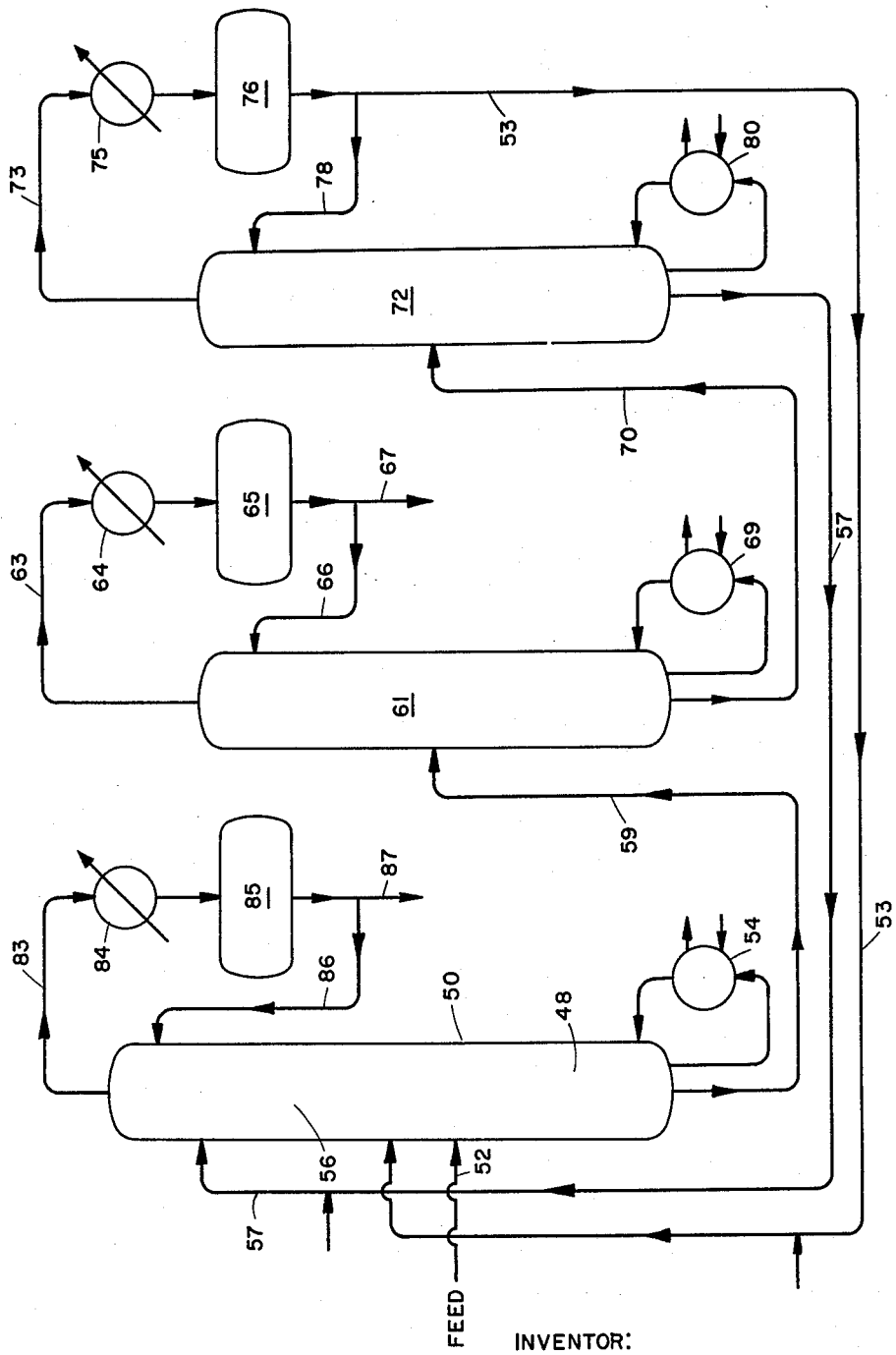
Fig. 2 is a schematic diagram of an alternative system.

In the system illustrated in Fig. 2 a $C_8$ xylene containing fraction having a boiling range of about 260° F. to 315° F. obtained from a reformed naphtha feed enters a lower section 48 of an extractive distillation column 50 via a line 52. The phenol solvent for the extraction of the xylenes is introduced to the top portion of the extractive distillation zone of the column through a line 53. The heat required for the operation of the column is supplied by a reboiler 54.

The raffinate from the extractive distillation zone 48 of the column passes upwardly into an overlying rectification or knock-back zone 56 which constitutes the upper portion of the column 50. This zone is provided with a number of rectifying plates. The raffinate from the underlying extractive distillation zone of the column contains some phenol. Phenol will normally azeotrope with all of the $C_8$ paraffins in the usual xylene fraction. The several plates of the knock-back section are unable to separate the phenol from the raffinate by simple rectification and in order to achieve this separation a stream made up of a mixture of alkyl phenols is admitted to an upper level of the column via a line 57. The mixture used in this instance has a boiling range of 464° F. to 572° F. The mixture contains some $C_3$ alkyl phenols but is principally made up of $C_4$ and higher alkyl phenols. The mixture of alkyl phenols enters the rectification zone at a few trays below the top of the zone for the reason mentioned in the description of Fig. 1. The introduction of the second solvent to the upper portion of the rectification zone assures the presence of that material in the liquid of each succeeding lower tray and thereby reduces the volatility of the phenol relative to its normal azeotrope formers on each of the trays. In the process illustrated in Fig. 2 the high boiling alkyl phenol mixture passes through the lower extractive distillation zone and is removed from the bottom of the column in the extract phase via a line 59 and is passed to a first fractionating column 61 wherein the product xylenes are stripped therefrom, leaving overhead in a line 63 which opens into a condenser 64. Condensate formed in this condenser collects in a receiver 65 and from there a portion of it is refluxed in line 66 to the top of the fractionating column and the rest is removed in a product line 67. The heat needed for this stripping column is supplied by a reboiler 69. A stream made up of the added second solvent and the primary phenol solvent is continuously removed from the bottom of the fractionating tower 61 in a line 70 which leads to a central section of a second fractionating column 72. This latter column is operated to distill overhead the phenol solvent which exits in a line 73, opening into a condenser 75. Liquid phenol from the condenser collects in a receiver 76 and is in part refluxed via a line 78 to the top of the second fractionating column and the rest of the recovered phenol is returned in the previous mentioned line 53 to the extractive distillation column 50. A reboiler 80 supplies the heat needed for the operation of this second fractionating column.

The raffinate substantially free of phenol is removed from the extractive distillation column through a line 83 to a condenser 84. The liquid raffinate from the condenser collects in a receiver 85, from which a portion is refluxed through a line 86 to the top tray of the extractive distillation column. The rest of the raffinate condensate from the receiver leaves in a line 87.

The system of Fig. 1 may be advantageously used where the overloading of the extractive distillation zone would occur if all of the high boiling alkyl phenol mixture should descend through it. Another advantage inherent in the process of Fig. 1 is a considerable heat economy over that required for the operation of the embodiment illustrated in Fig. 2. It will be noted that in the system of Fig. 2, all of the phenol solvent is vaporized in its separation in the second fractionating column 72, whereas in the process of Fig. 1 the phenol solvent is removed as the bottom liquid of stripper 18 and recycled without vaporization to the extractive distillation column. This is of significance since phenol constitutes the largest stream of the process and it is accordingly profitable to avoid its vaporization. Another advantage of the process of Fig. 1 over that of Fig. 2 is that its practice provides the most effective solvent in the extractive distillation zone since phenol provides more favorable relative volatilities than the higher alkyl phenols for the separation of toluene or xylene in the extractive distillation zone.

The system of Figs. 3A and 3B is a plant suitable for the recovery of benzene, toluene, and xylenes from a straight run or a reformed naphtha stream. The straight run or reformed naphtha say of a boiling range extending from 145° F. to 315° F. is admitted through a line 90 to the central section of a fractionator 92. The fractionator is operated to recover overhead a benzene containing $C_6$ fraction of a boiling range of about 145°–200° F. The heat needed for the operation of the tower is supplied by a reboiler 93. The overhead gaseous stream passes through a line 95 to a condenser 96. The $C_6$ condensate collects in a receiver 97 and from there a portion of the liquid is returned through a reflux line 99 to the top of the fractionator and the rest of the benzene containing $C_6$ fraction is removed from the receiver through a line 100 and an open valve 121 to a $C_6$ fraction storage tank 101. The bottom fraction from the fractionator 92 is passed through a line 103 and open valve 104 to a storage tank 106. A valve 107 in the removal line 103 is closed, directing the fractionator bottoms through the previously mentioned open valve 104 into the storage tank 106. Similarly, a valve 108 in the removal line 100 leading from the receiver 97 is closed to direct the $C_6$ fraction into its proper storage tank.

The normal feed to column 92, in line 90 is stopped and a valve 114 is closed. Next, the toluene and xylene containing fraction is removed from the storage tank 106 through an exit line 110, an open valve 111 to a return line 113. A valve 115 in this latter line is open, permitting the toluene and xylene containing fraction to enter the fractionating column 92 through the feed line 90. The fractionator at this point in time is operated to take overhead a toluene containing $C_7$ fraction having a boiling range of about 200° F.–260° F. The bottom fraction which will have a boiling range of about 260–315° F. is principally a $C_8$ fraction, containing the xylenes. The $C_7$ fraction following condensation and return of a portion of it as reflux via line 99, moves through the removal line 100 from the receiver 97 and the open valve 108 and also the open valve 117 to a $C_7$ fraction storage tank 119. At the beginning of this operation a valve 121 is closed and a valve 120 is opened until the lines have been purged into tank 205. Then valve 120 in the line 100 beyond the $C_7$ take off line is closed, preventing the flow of the toluene containing fraction beyond that juncture. Valve 121 in the $C_6$ take off line is also closed, forestalling the flow of the $C_7$ fraction to $C_6$ storage. At the start of the operation for separating $C_7$ and $C_8$ fractions the xylene containing $C_8$ fraction is removed from the bottom of the tower through the line 103, through the open valves 107 and 125, with valves 104 and 124 closed, into the purge tank 205. Then valve 124 is opened and valve 125 is closed and the stream flows to the $C_8$ fraction storage tank 123. When this operation is completed valve 115 is closed and new feed can be introduced into line 90 through valve 114 and the operations described above can be repeated, always purging the product lines at the beginning of each new operation. The product in the purge tank 205 can be recycled through valves 204, 206, 207, and 115 via lines 203 and 113 into the line 90 while normal feed is flowing to the column.

Now the feed has been divided into three fractions, each of which contains chiefly one of the three desired aromatic materials.

The benzene containing $C_6$ fraction is removed from its storage tank 101 through an open valve 127 to a feed line 128 and is introduced to a central section of an extractive distillation column 131. Phenol, the extractive distillation solvent, enters the top of an extractive distillation zone 130 through a line 133. The heat needed for the operation of the column is supplied by a reboiler 134. The descending solvent extracts the benzene from the feed stock and is removed in a solvent extract phase from the base of the tower via a line 136 and is passed to a conventional solvent stripper 137 where the phenol is separated from the benzene with the latter being recovered overhead in a line 138. A reboiler 140 furnishes the heat required for the operation of the stripper. The stripped phenol solvent free of the benzene returns to the extractive distillation column through the previous mentioned line 133. The overhead benzene vapor stream is condensed in a condenser 141 and collected in a receiver 142. The reflux needed for the operation of the phenol stripper is returned to the top vessel via a line 143 and the rest of the benzene is removed from the receiver through a line 144 to a benzene storage vessel 146. In the case of benzene recovery there is no need to introduce a high boiling alkyl phenol into the rectifying zone 148. The phenol can be readily separated from the raffinate by ordinary rectification since phenol does not azeotrope with any of the saturates of the $C_6$ fraction. The $C_6$ saturates containing some phenol escape from the underlying extractive distillation zone 130 through a trap out tray 147 into the rectification zone 148. Here the phenol is rectified back and together with hydrocarbon liquid flows through an open valve 200 and by-pass line into the top of the extractive distillation zone. For benzene recovery valves 199, 201 and 209, and normally 154, are closed and column 178 is not in operation. The $C_6$ saturates leave via a line 150, passing to a condenser 151 and a condensate receiver 152. Reflux needed for the operation of the column is supplied via lines 153 and 170 and open valve 171 to the top of the column. For this operation valve 154 is normally closed. The $C_6$ saturates are removed from the receiver 152 through a line 155 and a valve 158 to $C_6$ saturate storage. Line 155 is blocked beyond the $C_6$ saturate take off line 156 by a closed valve 157. The $C_6$ saturate stream consists of $C_6$ paraffins and naphthenes and of iso $C_7$ paraffins. Upon completion of the extractive distillation of the $C_6$ fraction, valve 127 is closed and the toluene containing $C_7$ fraction is pumped through an open valve 159 from its storage tank 119 to the feed line 128 and from there introduced into the central portion of the extractive distillation zone 131. The phenol solvent descending through the tower extracts the toluene from the feed stock and is removed is a solvent extract phase from the base of the tower via the line 136 and passed to the phenol stripper 137. Toluene overhead is condensed and collected in the receiver 142, refluxed in part and the remainder removed through the line 144. While toluene is being separated valve 167 in the benzene take off line is closed. At the beginning of this operation the lines are purged through open valves 161, 168, 176, 202 and 204 via lines 177 and 203 to the purge tank 205 while valve 163 is closed. After purging the lines valve 163 is opened and valve 168 is closed so that normal operation allows the toluene fraction to flow via line 162 into its appropriate storage tank 165. The saturates and some of the phenol pass up through the trap out tray 147 into the rectification zone 148. Ordinary rectification will not completely remove the phenol as it azeotropes with the higher boiling $C_8$ saturates normally present. Hence, a solvent mixture of the higher alkyl phenols (boiling range preferably of 464° F.–572° F.) is supplied to a tray in the upper portion of the rectification zone 148. This volatility modifier permits substantially complete knock-back of the phenol with the result that there is removed overhead from the rectification zone a substantially phenol-free $C_7$ saturate stream. The $C_7$ saturate condensate collecting in the receiver 152 is divided, portions of it being returned as reflux to columns 178 and 131. For extractive distillation column 131 the reflux may be split between the top of the rectification zone and the top of the extractive distillation zone. If the latter is to receive a share of the reflux, the stream moves at least in part through the line 153 and valve 154. The top of the rectification zone in column 131 is supplied with reflux through a line 170 and the open valve 171 disposed therein. The reflux to column 178 is supplied through valve 209 and line 210 which takes off from the receiver 152. The $C_7$ saturate condensate not refluxed is removed from the receiver through the removal line 155, with valve 158 closed and valve 157 in its open position, to a $C_7$ saturate take off line 172. The $C_7$ saturate stream moves through the open valve 173 in the take off line to storage. In this instance a valve 174 in the removal line 155 beyond the $C_7$ take off line is closed.

The liquid collecting on the trap out tray 147 is removed from the bottom of the rectification zone through open valve 201 and via line 177a (with valve 200 of the by-pass line closed) to a fractionation column 178. Here the volatility modifier is separated from the rest of the liquid, collecting as bottoms in the column 178 and returning through a line 181 to the rectification zone. Make up volatility modifier is supplied via a line 208. Heat needed for the operation of the column 178 is supplied by a reboiler 179, distilling overhead the non-volatility modifier portion of the withdrawn stream, which overhead material is returned in a line 180 through open valve 199 to the column at a point below the withdrawal tray and to a tray below the phenol solvent inlet.

The xylene containing $C_8$ fraction of the storage tank 123 may be removed therefrom through an open valve 182 and the feed line 128 to the extractive distillation column 131. The extractive distillation solvent removes the xylenes from the $C_8$ saturates which, containing some phenol, pass overhead into the rectification zone. The phenol and extracted xylene are removed through the line 136 to the phenol stripper. There, the xylenes pass overhead and the phenol, stripped substantially free of the aromatic, is returned through the line 133 to the extractive distillation column. As in the preceding transition from benzene to toluene recovery, it is necessary to operate the stripper for an interval of time with the xylenes flowing through the line 144 and through valve 176 to line 177. In this manner it is possible to remove the toluene remaining therein with the flushing stream of xylenes through the line 177 and the open valves 202, 206 and 111 through the take-off line 110, into the joint $C_7$ and $C_8$ storage tank 106. During this operation valve 207 is closed. After the lines have been purged the xylene stream goes to xylene storage 190 through take off line 191 and its open valve 192 from the previously mentioned receiver exit line 144.

The $C_8$ saturates, containing some phenol, enter the rectification zone 148 of the column 131 through the trap out tray 147. The alkyl phenol volatility modifier reduces the volatility of the phenol relative to the raffinate, with the result that a substantially phenol-free raffinate is withdrawn in line 150 to the condenser 151 and receiver 152. The column receives reflux as before and the raffinate $C_8$ saturates are removed through the line 155, through open valves 157, 174 and 198 to $C_8$ saturates storage.

Liquid is removed, as described before for toluene recovery from the trap out tray 147 and passed via line 177 to the fractionator 178 for the separation of the hydrocarbons and phenol from the alkyl phenols. The latter is recycled via line 181 to the rectification zone and the hydrocarbons and phenol are returned via line 180 through the open valve 199 to the upper region of the extractive distillation zone 130. As with toluene operations, valve 200 is always closed and valves 199, 201 and 209 are always open when the process is being operated for xylene recovery.

I hereby claim as my invention:

1. In an extractive distillation process using phenol as the solvent introduced into the upper section of an extractive distillation zone above the feed entry, for the recovery of an aromatic material selected from the group consisting of toluene and xylene from a hydrocarbon feed containing a compound which normally azeotropes with phenol, thereby causing some of the phenol to escape overhead with a raffinate and wherein there is provided a rectification zone having a number of liquid carrying plates beyond the extractive distillation zone to further the separation of the solvent from the raffinate, the improvement which comprises introducing an alkyl phenol stream into the upper level of the rectification zone and causing it to pass into the liquid of the trays of the rectification zone and maintaining the alkyl phenol in liquid phase thereon, the amount of alkyl phenol being 0.03 to 0.35 volume of alkyl phenol per volume of raffinate, sufficient to reduce significantly the loss of phenol in the raffinate, said alkyl phenol having a boiling point in excess of about 392° F. and having at least 8 carbon atoms per molecule, removing overhead from the rectification zone a raffinate with a significantly reduced phenol content relative to that experienced in the absence of the alkyl phenol, withdrawing the liquid collecting in the lower section of the rectification zone and passing said liquid to a distillation zone wherein the alkyl phenol is isolated as distillation bottoms from the remainder of the withdrawn liquid as a distillation overhead, returning the distillation overhead to the extractive distillation zone and reintroducing the alkyl phenol distillation bottoms into the upper level of the rectification zone.

2. A process in accordance with claim 1 wherein the material maintained in the liquid of the trays is a mixture of alkyl phenols having a boiling range within the temperature of 464° F. and 572° F.

References Cited in the file of this patent

UNITED STATES PATENTS

| | | |
|---|---|---|
| 2,375,035 | Pierotti | May 1, 1945 |
| 2,406,695 | Lake | Aug. 27, 1946 |
| 2,496,253 | Purcell et al. | Jan. 31, 1950 |
| 2,520,006 | Hibshman et al. | Aug. 22, 1950 |